US 8,594,674 B2

(12) United States Patent
Jung et al.

(10) Patent No.: US 8,594,674 B2
(45) Date of Patent: Nov. 26, 2013

(54) MEASUREMENT METHOD FOR GENERATING CELL COVERAGE MAP AND DEVICE FOR THE SAME

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/576,616

(22) PCT Filed: Jan. 31, 2011

(86) PCT No.: PCT/KR2011/000646
§ 371 (c)(1),
(2), (4) Date: Oct. 9, 2012

(87) PCT Pub. No.: WO2011/093681
PCT Pub. Date: Aug. 4, 2011

(65) Prior Publication Data
US 2013/0029666 A1    Jan. 31, 2013

Related U.S. Application Data

(60) Provisional application No. 61/300,409, filed on Feb. 1, 2010.

(51) Int. Cl.
*H04W 36/30* (2009.01)
(52) U.S. Cl.
USPC ...... 455/436; 455/438; 455/115.2; 455/226.2
(58) Field of Classification Search
USPC .................. 455/436–439, 115.1–3, 226.1–2
See application file for complete search history.

(56) References Cited

U.S. PATENT DOCUMENTS 8,103,280 B2 * 1/2012 Austin et al. .................. 455/447
8,385,908 B2 * 2/2013 Ivarez Medina et al. ..... 455/423
(Continued)

FOREIGN PATENT DOCUMENTS

KR    10-2009-0016431 A    2/2009

OTHER PUBLICATIONS

3GPP TR 36.805(V2.0.0), "Study on Minimization of drive-test in Next Generation Networks", Dec. 31, 2009.

*Primary Examiner* — Cong Tran
(74) *Attorney, Agent, or Firm* — McKenna Long & Aldridge LLP

(57) ABSTRACT

A measurement method for minimization of drive test (MDT) comprises steps of: receiving measured frequency information for cell reselection and measured frequencies for MDT; measuring a quality of a serving cell; performing a first quality measurement on a neighboring cell; performing a second quality measurement on the neighboring cell; and storing results of the first and second quality measurements, wherein the step of performing the first quality measurement includes performing an intra-frequency measurement for the MDT on the neighbor cell when the frequency of the serving cell is included in the MDT frequencies, and performing the intra-frequency measurement for the neighbor cell only in the event where the quality of the serving cell in a first threshold value or less when the frequency of the serving cell is not included in the MDT frequencies, and the step of performing a second quality measurement includes performing an intra-frequency measurement for the MDT on the neighbor cell when an inter-frequency in the measured frequency information for the cell reselection is the MDT measurement frequency, and performing an intra-frequency measurement on the neighbor cell only in a case where the quality of the serving cell is a second threshold value or less when the inter-frequency in the measured frequency information for the cell reselection is not the MDT measurement frequency.

11 Claims, 5 Drawing Sheets

(56) References Cited

U.S. PATENT DOCUMENTS

| | | |
|---|---|---|
| 2005/0042987 A1 | 2/2005 | Lee et al. |
| 2009/0036116 A1 | 2/2009 | Kim et al. |
| 2011/0098042 A1* | 4/2011 | Mach et al. ............... 455/435.1 |
| 2011/0183676 A1* | 7/2011 | Lee et al. ...................... 455/438 |
| 2012/0039191 A1* | 2/2012 | Foster et al. .................. 370/252 |
| 2012/0088457 A1* | 4/2012 | Johansson et al. ......... 455/67.11 |
| 2012/0309431 A1* | 12/2012 | Bodog ....................... 455/456.6 |
| 2012/0322440 A1* | 12/2012 | Jeong et al. ................... 455/425 |

\* cited by examiner

MEASUREMENT METHOD FOR GENERATING CELL COVERAGE MAP AND DEVICE FOR THE SAME

This Application is a 35 U.S.C. §371 National Stage Entry of International Application No. PCT/KR2011/000646, filed Jan. 31, 2011 and claims the benefit of U.S. Provisional Application No. 61/300,409, filed Feb. 1, 2010, which is incorporated by reference in its entirety herein.

TECHNICAL FIELD

The present invention relates to a measurement method for generating a cell coverage map, and more particularly, to a measurement method for minimization of drive test (MDT) and a device for the same.

BACKGROUND ART

A $3^{rd}$ generation partnership project long term evolution (3GPP LTE) (hereinafter, referred to as 'LTE') communication system which is an example of a mobile communication system to which the present invention can be applied will be described in brief.

FIG. 1 is a diagram illustrating a network structure of an Evolved Universal Terrestrial Radio Access Network (E-UTRAN) which is an example of a mobile communication system. The E-UTRAN system is an evolved version of the conventional UTRAN system, and its basic standardization is in progress under the 3rd Generation Partnership Project (3GPP). The E-UTRAN system may be referred to as a Long Term Evolution (LTE) system.

Referring to FIG. 1, the E-UTRAN system includes a eNBs (e-NodeB or base station), which are connected with each other through an interface X2. Also, each of the eNBs is connected with a user equipment (UE) through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment. The access information or the ability information is mainly used for mobility management of the user equipment. The S-GW is a gateway having the E-UTRAN as an end point, and the PDN-GW is a gateway having a packet data network (PDN) as an end point.

Layers of a radio interface protocol between the user equipment and a network may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and serves to control radio resources between the user equipment and the network. To this end, the RRC layer allows the user equipment and the base station to exchange RRC messages with each other.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

DISCLOSURE

Technical Problem

An object of the present invention devised to solve the conventional problem is to provide a measurement method for MDT of a user equipment, which enables a network to obtain a coverage map of good quality for a specific frequency and at the same time does not affect an operation related to cell reselection of the user equipment.

Technical Solution

To solve the aforementioned technical problems, according to one aspect of the present invention, a measurement control method for minimization of drive test (MDT) in a user equipment, the measurement control method comprising the steps of receiving measurement frequency information for cell reselection and measurement frequencies for MDT (MDT frequencies); measuring a quality of a serving cell; performing a first quality measurement for a neighboring cell; performing a second quality measurement for the neighboring cell; and storing results of the first and second quality measurements, wherein the step of performing the first quality measurement includes performing intra-frequency measurement for the MDT for the neighboring cell when the frequency of the serving cell is included in the MDT frequencies, and performing the intra-frequency measurement for the neighboring cell only in the case where the quality of the serving cell is less than a first threshold value when the frequency of the serving cell is not included in the MDT frequencies, and the step of performing the second quality measurement includes performing intra-frequency measurement for the MDT for the neighboring cell when an inter-frequency in the measured frequency information for the cell reselection corresponds to the MDT frequencies, and performing inter-frequency measurement for the neighboring cell only in the case where the quality of the serving cell is less than a second threshold value when the inter-frequency in the measured frequency information for the cell reselection does not correspond to the MDT frequencies.

Also, the result of quality measurement for the MDT in the result of measurement for the neighboring cell may be excluded from cell reselection evaluation.

In respect of the step of performing measurement, the first threshold value may be a value Sintrasearch and the second threshold value may be a value Snonintrasearch.

Meanwhile, the measurement control method further comprises the step of performing measurement for the MDT for the neighboring cell for a specific frequency which is not included in the measurement frequency for the cell reselection, among the MDT frequencies.

The measurement control method may further comprise the step of performing the cell reselection considering the result of quality measurement for the neighboring cell.

The measurement control method may further comprise the step of transmitting the result measured for the MDT for the neighboring cell to a network.

To solve the aforementioned technical problems, according to another aspect of the present invention, a user equipment in a wireless communication system comprises a reception module receiving measurement frequency information for cell reselection and measurement frequencies for minimization of drive test (MDT frequencies); a processor measuring a quality of a serving cell and performing a first quality measurement for a neighboring cell and a second quality measurement for the neighboring cell; and a memory storing results of the first and second quality measurements, wherein, in respect of the first quality measurement, the processor performs intra-frequency measurement for the MDT for the neighboring cell when the frequency of the serving cell is included in the MDT frequencies, and performs the intra-frequency measurement for the neighboring cell only in the case where the quality of the serving cell is less than a first threshold value when the frequency of the serving cell is not included in the MDT frequencies, and in respect of the second quality measurement, the processor performs inter-frequency measurement for the MDT for the neighboring cell when an inter-frequency in the measured frequency information for the cell reselection corresponds to the MDT frequencies, and performs the inter-frequency measurement for the neighboring cell only in the case where the quality of the serving cell is less than a second threshold value when the inter-frequency in the measured frequency information for the cell reselection does not correspond to the MDT frequencies.

The processor may exclude the result of quality measurement for the MDT in the result of measurement for the neighboring cell from cell reselection evaluation.

Meanwhile, the user equipment may further comprise a transmission module transmitting the result measured for the MDT for the neighboring cell to a network.

Advantageous Effects

According to the embodiments of the present invention as described above, a network can obtain a coverage map of good quality for a desired frequency by receiving a measurement result of a user equipment for the corresponding frequency from a plurality of user equipments. As a result, the network can optimize a service area more efficiently.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. For example, although the following description will be made based on 3GPP LTE based system, the following description may be applied to various wireless communication systems, such as IEEE 802.16 based system, to which MDT measurement technology may be applied.

Meanwhile, the following detailed description includes detailed matters to provide full understanding of the present invention. However, it will be apparent to those skilled in the art that the present invention can be carried out without the detailed matters. In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Hereinafter, a measurement control method for MDT will be described.

Figure 1:
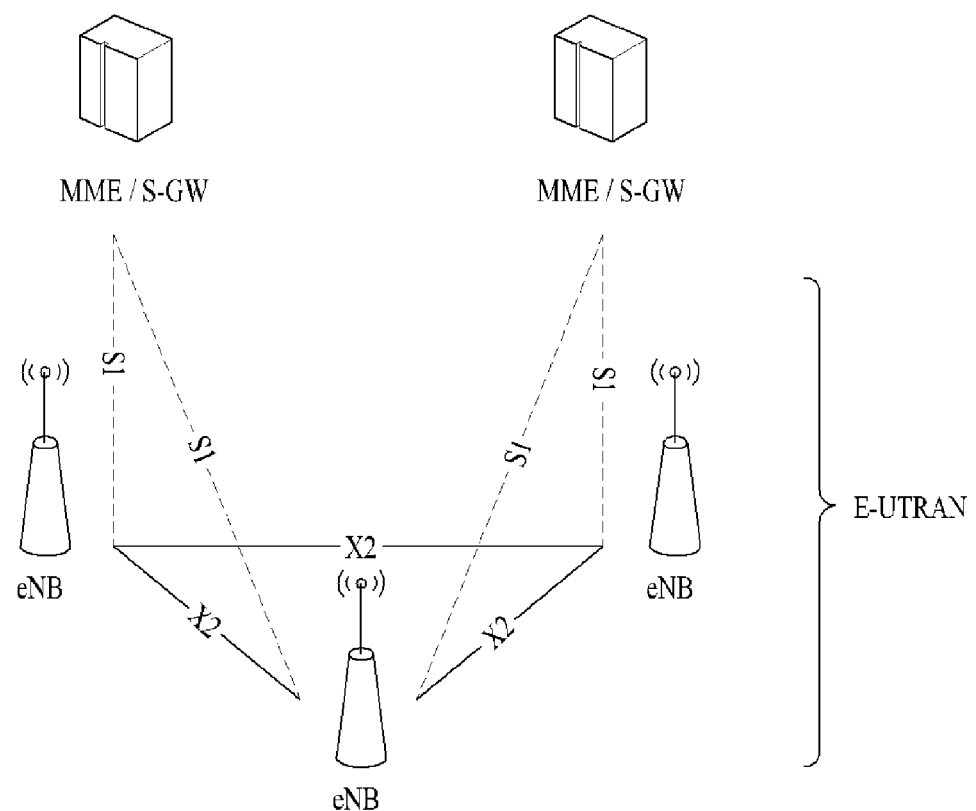
FIG. 1 is a diagram illustrating a network structure of an evolved universal terrestrial radio access network (E-UTRAN) which is an example of a mobile communication system.
Figure 2:
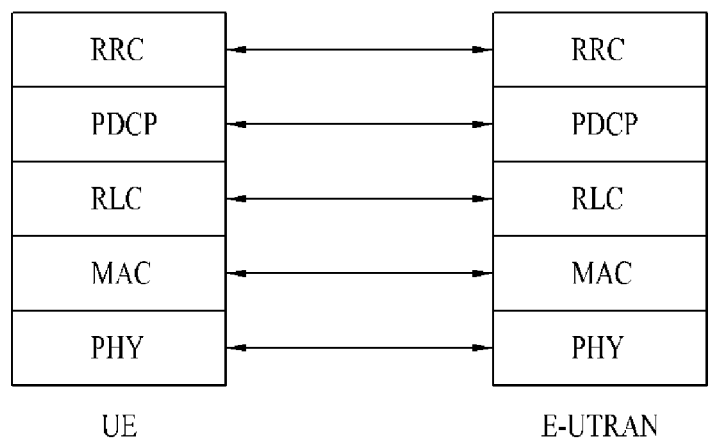
FIG. 2 and FIG. 3 are diagrams illustrating structures of a radio interface protocol between a user equipment and E-UTRAN based on the 3GPP radio access network standard.
Figure 3:
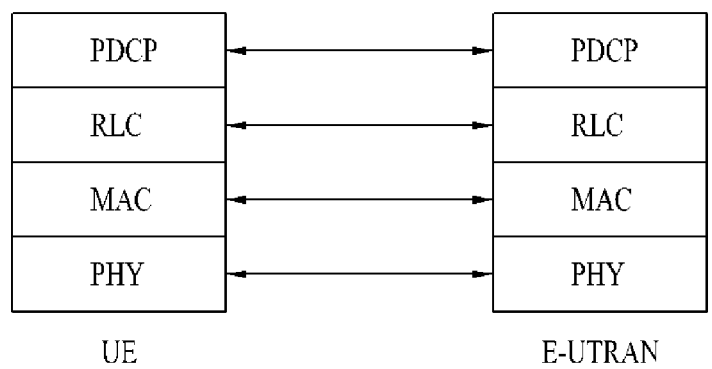

FIG. 2 and FIG. 3 are diagrams illustrating structures of a radio interface protocol between a user equipment and E-UTRAN based on the 3GPP radio access network standard.

The radio interface protocol horizontally includes a physical layer, a data link layer, and a network layer, and vertically includes a user plane for data information transfer and a control plane for control signal transfer. The protocol layers in FIG. 2 and FIG. 3 may be classified into L1 (first layer), L2 (second layer), and L3 (third layer) based on three lower layers of the open system interconnection (OSI) standard model widely known in the communications systems. The radio protocol layers exist in the user equipment and the E-UTRAN in pairs, and play the role of data transmission of a radio interval.

Hereinafter, each layer of a radio protocol control plane of FIG. 2 and a radio protocol user plane of FIG. 3 will be described.

A physical layer corresponding to the first layer provides an information transfer service to an upper layer using a physical channel. The physical layer is connected to a medium access control (MAC) layer above the physical layer through a transport channel. Data are transferred between the MAC layer and the physical layer through the transport channel. Also, data are transferred between different physical layers, i.e., physical layers of a transmitting side and a receiving side through a physical channel. The physical channel is modulated in accordance with an orthogonal frequency division multiplexing (OFDM) scheme, and uses time and frequency as radio resources.

A MAC layer of the second layer provides a service to a radio link control (RLC) layer corresponding to its upper layer through a logical channel. The RLC layer of the second layer supports reliable data transmission. A function of the RLC layer may be implemented by a functional block within the MAC layer. In this case, the RLC layer may not exist. In order to effectively transmit IP packets such as IPv4 or IPv6 within a radio interface having a narrow bandwidth, a PDCP (packet data convergence protocol) layer of the second layer performs header compression to reduce a size of an IP packet header that is a relatively great and includes unnecessary control information.

A radio resource control (RRC) layer located on the lowest part of the third layer is defined in the control plane only and is associated with configuration, reconfiguration and release of radio bearers (RBs) to be in charge of controlling the logical, transport and physical channels. At this time, the radio bearer means a service provided by the second layer for data transfer between the user equipment and the E-UTRAN. If the RRC layer of the user equipment is RRC-connected with the RRC layer of the E-UTRAN, the user equipment may be in RRC connected (RRC_CONNECTED) state. If not so, the user equipment may be in RRC idle (RRC_IDLE) state.

Examples of downlink transport channels carrying data from the network to the user equipment include a broadcast channel (BCH) carrying system information and a downlink shared channel (SCH) carrying user traffic or control messages. Traffic or control messages of a downlink multicast or broadcast service may be transmitted through the downlink SCH or a separate downlink multicast channel (MCH). Meanwhile, examples of uplink transport channels carrying data from the user equipment to the network include a random access channel (RACH) carrying an initial control message and an uplink shared channel (SCH) carrying user traffic or control message.

Examples of logical channels located above the transport channels and mapped with the transport channels include a broadcast control channel (BCCH), a paging control channel (PCCH), a common control channel (CCCH), a multicast control channel (MCCH), and a multicast traffic channel (MTCH).

The physical channel includes several subframes on a time axis and several subcarriers on a frequency axis. In this case, one subframe includes a plurality of symbols on the time axis. One subframe includes a plurality of resource blocks, each of which includes a plurality of symbols and a plurality of subcarriers. Also, for a physical downlink control channel (PDCCH), that is, L1/L2 control channel, each subfame may use specific subcarriers of specific symbols (for example, the first symbol) of the corresponding subframe. One subframe may include two slots each having a length of 0.5 ms, wherein the two slots may correspond to 1 ms corresponding to a transmission time interval (TTI) which is a transmission unit time of data.

Hereinafter, RRC state of the user equipment and RRC connection method will be described.

The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state. Since the E-UTRAN may identify the presence of the user equipment which is in the RRC_CONNECTED state, on the basis of cell unit, it may effectively control the user equipment. On the other hand, the E-UTRAN may not identify the user equipment which is in the RRC_IDLE state, on the basis of cell unit. In this case, the user equipment is managed by the core network (CN) on the basis of tracking area (TA) unit which is a local unit greater than the cell unit. In other words, the presence of the user equipment which is in the RRC_IDLE state is identified on the basis of great local unit, and in order that the user equipment which is in the RRC_IDLE state receives a normal mobile communication service such as voice or data, the user equipment should be shifted to the RRC_CONNECTED state.

When the user initially turns on the power of the user equipment, the user equipment searches for a proper cell and then is maintained in the RRC_IDLE state in the corresponding cell. The user equipment maintained in the RRC idle state performs RRC connection with the RRC layer of the E-UTRAN only if the RRC connection is required, and then is shifted to the RRC_CONNECTED state. In this case, the case where the RRC connection is required may include a case where uplink data transmission is required due to calling attempt of the user or a case where a response message to a paging message transmitted from the E-UTRAN should be transmitted.

A non-access stratum (NAS) layer located above the RRC layer performs functions such as session management and mobility management.

For mobility management of the user equipment, two types of states, an EPS mobility management registered (EMM-REGISTERED) state and an EMM unregistered (EMM-DEREGISTERED) state are defined in the NAS layer. These two states are applied to the user equipment and the MME. The user equipment is initially in the EMM-DEREGISTERED state, and performs a registration procedure with the corresponding network through an initial attach procedure to access the network. If the initial attach procedure is successfully performed, the user equipment and the MME are in the EMM-REGISTERED state.

Also, in order to manage signaling connection between the user equipment and the EPC, two types of states, an EPS connection management (ECM) idle (ECM_IDLE) state and an ECM connected (ECM_CONNECTED) state are defined in the NAS layer. These two states are applied to the user equipment and the MME. If the user equipment of the ECM idle state is RRC connected with the E-UTRAN, the corresponding user equipment is in the ECM connected state. If the MME which is in the ECM idle state is S1 connected with the E-UTRAN, it is in the ECM connected state. When the user equipment is in the ECM idle state, the E-UTRAN does not have context information of the user equipment. Accordingly, the user equipment which is in the ECM idle state performs a user equipment based mobility related procedure such as cell selection or cell reselection without any command from the network. On the other hand, when the user equipment is in the ECM connected state, mobility of the user equipment is managed by the command of the network. If the position of the user equipment is different from that known by the network in the ECM idle state, the user equipment notifies the network of its position through a tracking area (TA) update procedure.

Hereinafter, system information will be described.

The system information includes essential information that should be known by the user equipment to access the base station. Accordingly, the user equipment should receive all kinds of system information before accessing the base station, and should always have the latest system information. Since the system information should be known by all the user equipments in one cell, the base station periodically transmits the system information.

The system information is classified into a mater information block (MIB), a scheduling block (SB), and a system information block (SIB). The MIB notifies the user equipment of physical configuration (for example, bandwidth) in respect of a corresponding cell. The SB notifies the user equipment of transport information (for example, transport period) of the SIBs. The SIB is a set of associated system information. For example, one SIB includes only information of a neighboring cell, and another SIB includes only information of an uplink radio channel used by the user equipment.

In the meantime, services provided from the network to the user equipment may be classified into three types of services. The user equipment recognizes the types of the cells differently depending on which service may be provided thereto. Hereinafter, service types will first be described and then types of the cells will be described.

1) Limited service: this service provides emergency call and ETWS (Earthquake and Tsunami Warning System) and may be provided by an acceptable cell.

2) Normal service: this service means a service of public use and may be provided by a suitable cell.

3) Operator service: this service means a service for a communication network provider, and may be used by the communication network provider only and cannot be used by a general user.

In respect of the service types provided by the cells, the types of the cells may be classified as follows.

1) Acceptable cell is the cell that allows the user equipment to receive a limited service. This cell is not barred in view of the corresponding user equipment, and satisfies a reference for cell selection of the user equipment.

2) Suitable cell is the cell that allows the user equipment to receive a normal service. This cell satisfies a condition of the acceptable cell and at the same time satisfies additional conditions. The additional conditions include that this suitable cell should belong to PLMN that may be accessed by the corresponding user equipment, and should be a cell that does not prohibit a tracking area update procedure of the user equipment. If the corresponding cell is a CSG cell, the user equipment should be a cell that allows the user equipment to access the cell as a CSG member.

3) Barred cell is the cell broadcasting that the cell is the barred cell, through the system information.

4) Reserved cell is the cell broadcasting that the cell is the reserved cell, through the system information.

Now, measurement and measurement report will be described.

In the following description, 'measurement' may be defined in such a manner that the user equipment receives reference signals from cells located at inter-frequency, intra-frequency and inter-RAT in accordance with measurement configuration received from the network and measures a quality value of the corresponding cell. Also, in the following description, 'quality' means signal quality or cell quality identified through a reference signal from a target cell for measurement.

In respect of mobility support of the user equipment in the wireless communication system, the user equipment continues to measure quality of a serving cell, which currently provides a service, and quality of a neighboring cell. The user equipment reports the measured result to the network at a proper time, and the network provides the user equipment with optimized mobility through handover, etc.

In addition to mobility support, the user equipment may perform measurement specifically intended by the network and report the measured result to the network to provide information that may be useful to allow a network provider to manage the network. For example, the user equipment receives broadcast information of a specific cell determined by the network. The user equipment may report cell identity (global cell identity) of the specific ell, position identification information (for example, tracking area code) of the specific cell, and/or other cell information (for example, information as to member of closed subscriber group (CSG) cell) to the serving cell.

If the user equipment which is moving identifies through measurement that quality of a specific area is very poor, it may report position information and measurement result for the cells having poor quality to the network. The network may optimize the network on the basis of the report of the measurement result of the user equipments that assist management of the network.

In a wireless communication system of which frequency reuse factor is 1, mobility is performed between different cells located at the same frequency band. Accordingly, in order to assure mobility of the user equipment well, the user equipment should measure quality of neighboring cells having the same center frequency as that of the serving cell and cell information well. In this way, measurement for the cells having the same center frequency as that of the serving cell will be referred to as intra-frequency measurement. The user equipment performs intra-frequency measurement and reports the measurement result to the network at a proper time, whereby an object of the measurement result may be achieved.

The mobile communication provider may manage the network by using a plurality of frequency bands. If a service of the communication system is provided through a plurality of frequency bands, the user equipment should measure quality of neighboring cells having center frequency different from that of the serving cell and cell information well to assure optimized mobility. In this way, measurement for the cells having center frequency different from that of the serving cell will be referred to as inter-frequency measurement. The user equipment should perform inter-frequency measurement and report the measurement result to the network at a proper time.

If the user equipment supports measurement for cells of a heterogeneous network, it may perform measurement for the cells of the heterogeneous network in accordance with configuration of the base station. Measurement for the heterogeneous network will be referred to as inter-RAT (radio access technology) measurement. For example, the RAT may include UTRAN (UMTS Terrestrial Radio Access Network) based on the 3GPP standard specification and GERAN (GSM EDGE Radio Access Network). The RAT may also include CDMA 2000 system based on the 3GPP2 standard specification.

Hereinafter, a cell reselection procedure will be described.

After the user equipment selects a cell through a cell selection procedure, signal strength or signal quality between the user equipment and the base station may be changed due to change in either mobility of the user equipment or a radio environment. If quality of the selected cell is deteriorated, the user equipment may select another cell that provides better quality. If the user equipment reselects such a cell, it selects a cell that provides signal quality better than that of the currently selected cell. This will be referred to as the cell reselection procedure. The cell reselection procedure is basically intended to select a cell that provides the best quality to the user equipment, in view of quality of a radio signal.

In addition to quality of the radio signal, the network may determine priority per frequency and notify the user equipment of the determined priority. The user equipment that has received the priority first considers the priority prior to quality basis of the radio signal for the cell reselection procedure.

As described above, the cell selection procedure or the cell reselection procedure may exist depending on signal features of the radio environment. The cell reselection procedure may be classified as follows in accordance with the RAT and frequency features of the cell.

(1) Intra-frequency cell reselection: the user equipment reselects a cell having the same RAT and the same center-frequency as those of a cell currently in service.

(2) Inter-frequency cell reselection: the user equipment reselects a cell having RAT and center-frequency different from those of a cell currently in service.

(3) Inter-RAT cell reselection: the user equipment reselects a cell having RAT different from that of a cell currently in service.

The cell reselection procedure will generally be performed as follows.

First, the user equipment receives parameter values for cell reselection from the base station.

Second, the user equipment measures quality of the serving cell and its neighboring cell for cell reselection.

Third, cell reselection is performed on the basis of the cell reselection basis.

In this case, the cell reselection basis has the following features in respect of measurement of the serving cell and the neighboring cell.

(1) The intra-frequency cell reselection is basically based on ranking. In this case, ranking means that index values for cell reselection evaluation are defined and cells are ranked in the order of size of the defined index values. In this case, the cell having the best index will be referred to as the best ranked cell. Also, the cell index value is obtained by applying frequency offset or cell offset, if necessary, on the basis of the value measured by the user equipment for the corresponding cell.

(2) The inter-frequency cell reselection is based on frequency priority provided by the network. The user equipment tries to camp on the frequency having the highest frequency priority. The network may provide frequency priority to be commonly applied to user equipments within the cell through broadcast signaling, or may provide priority per frequency to each user equipment through user equipment dedicated signaling.

(3) For the inter-frequency cell reselection, the network may provide parameters (for example, frequency-specific offset) used for cell reselection to the user equipment per frequency.

(4) For the intra-frequency or inter-frequency cell reselection, the network may provide a neighboring cell list (NCL) used for cell reselection to the user equipment. The neighboring cell list includes a cell specific parameter (for example, cell-specific offset) used for cell reselection.

(5) For the intra-frequency or inter-frequency cell reselection, the network may provide a cell reselection black list used for cell reselection to the user equipment. The user equipment does not perform cell reselection for the cell included in the black list.

Hereinafter, ranking performed for the cell reselection evaluation procedure will be described.

Ranking criterion used to rank the cells is defined as expressed by the following Equation 1.

$$Rs = Qmeas,s + Qhyst,\ Rn = Qmeas,n - Qoffset \qquad \text{[Equation 1]}$$

In this case, Rs means ranking criterion of the serving cell, Rn means ranking criterion of the neighboring cell, Qmeas,s means a quality value measured by the user equipment for the serving cell, Qmeas,n means a quality value measured by the user equipment for the neighboring cell, Qhyst means a hysteresis value for ranking, and Qoffset is offset between two cells.

In the intra-frequency, if the user equipment receives the offset value, $Qoffset_{s,n}$ between the serving cell and the neighboring cell, $Qffoset=Qoffset_{s,n}$, and if the user equipment does not receive the offset value, $Qoffset_{s,n}$, Qoffset=0.

In the inter-frequency, if the user equipment receives the offset value, Qoffset s,n for the corresponding cell, Qoffset=Qoffsets,n+Qfrequency, and if the user equipment does not receive the offset value, Qoffsets,n, Qoffset=Qfrequency.

If ranking criterion Rs of the serving cell and ranking criterion Rn of the neighboring cell are changed similarly, ranking is changed frequently, whereby the user equipment may reselect two cells alternately. Qhyst is a parameter for preventing two cells from being alternately reselected by the user equipment.

The user equipment measures $R_s$ of the serving cell and Rn of the neighboring cell in accordance with the Equation 1, regards the cell having the greatest ranking criterion value as the best ranked cell and reselects the corresponding cell.

It may be noted from the aforementioned criterion that quality of the cell acts as the most important criterion for cell reselection. If the reselected cell is not the suitable cell, the user equipment excludes the corresponding frequency or the corresponding cell from targets for cell reselection.

Next, a method for performing measurement while minimizing power consumption of a user equipment in respect of cell reselection will be described.

The user equipment measures the neighboring cells to access the better neighboring cell than the serving cell exists if the better neighboring cell exists. Measurement for the neighboring cells may cause power consumption of the user equipment. Accordingly, if quality of the serving cell is good, measurement for the neighboring cells may be omitted if possible to reduce power consumption of the user equipment. In order to use the power of the user equipment more efficiently, quality of the serving cell is compared with a threshold value in the LTE system, and measurement for the neighboring cells is omitted if the quality of the serving cell is higher than the threshold value.

In more detail, the network may set two kinds of threshold values to the user equipment. The threshold values may be set by the system information.

The first threshold value will be referred to as Sintrasearch, and if the quality of the serving cell is better than Sintrasearch, the user equipment may omit measurement for the neighboring cells having the same frequency as that of the serving cell. This threshold value may be included in cell reselection information transmitted from the base station. If the cell reselection information does not include the threshold value Sintrasearch, the user equipment cannot omit measurement for the neighboring cells having the same frequency as that of the serving cell.

The second threshold value will be referred to as Snon-intrasearch, and if the quality of the serving cell is better than Snon-intrasearch, the user equipment may omit measurement for the neighboring cells having frequency different from that of the serving cell. This threshold value may be included in the cell reselection information transmitted from the base station. If the cell reselection information does not include the threshold value Snon-intrasearch, the user equipment cannot omit measurement for the neighboring cells having frequency different from that of the serving cell.

Figure 4:
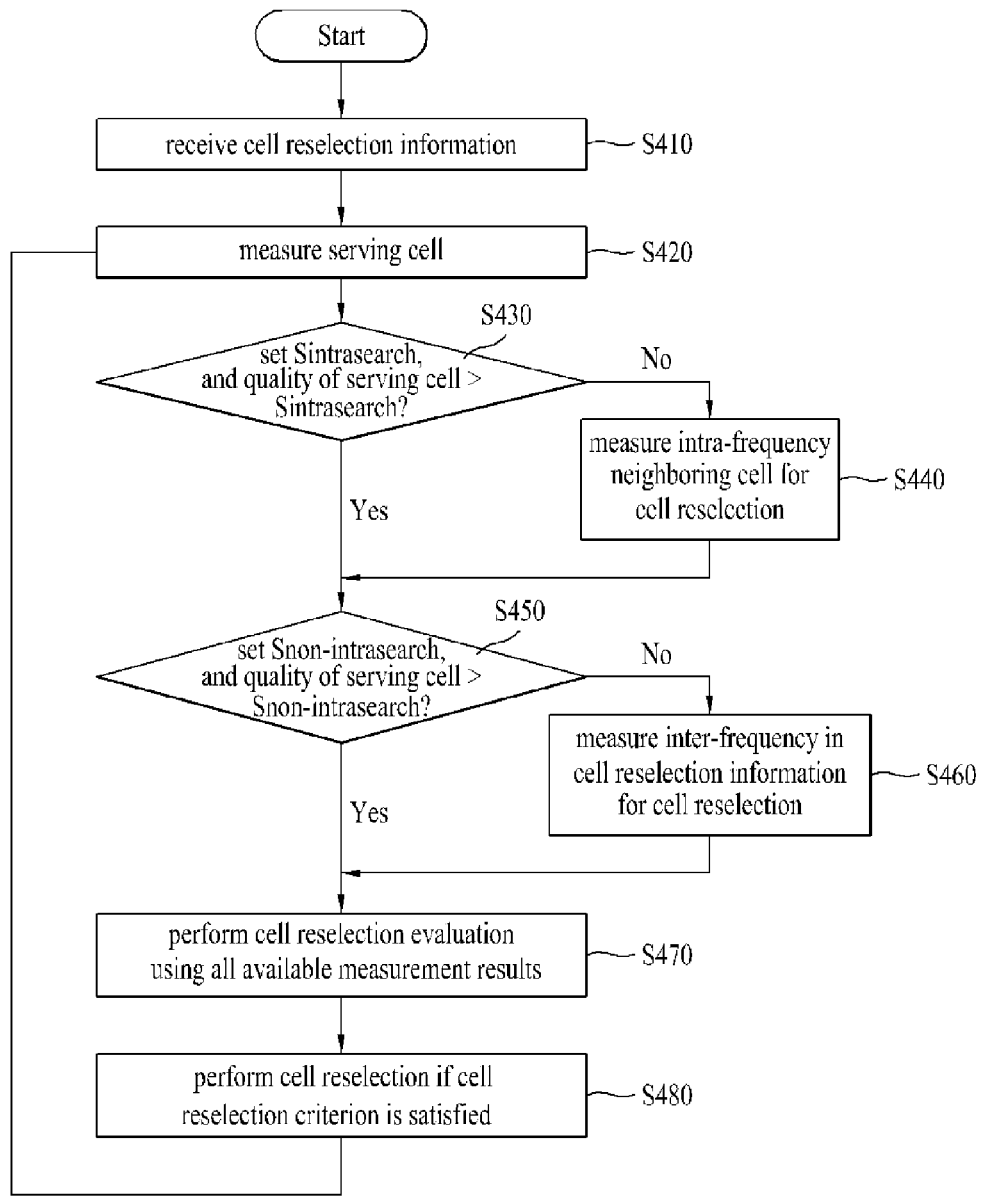
FIG. 4 is a flow chart illustrating a measurement method for cell reselection.

FIG. 4 illustrates a cell reselection procedure of a user equipment considering power efficient measurement.

A flow chart of the cell reselection procedure will be described with reference to FIG. 4. First of all, the user equipment receives cell reselection information (S410). The cell reselection information may include measurement frequency related to quality measurement for cell reselection, wherein the measurement frequency may include frequency information of the serving cell and intra frequency measurement frequency for cell reselection measurement.

The user equipment measures quality of the serving cell by measuring the serving cell (S420). In respect of the measured quality of the serving cell, the user equipment sets the first threshold value Sintraserach, and determines whether the quality of the serving cell exceeds the threshold value Sintraserch (S430). If the quality of the serving cell exceeds the threshold value Sintraserch, the user equipment may omit intra-frequency measurement. If the quality of the serving cell does not exceed the threshold value Sintraserch, the user equipment performs intra-frequency measurement for cell reselection (S440).

Afterwards, the user equipment sets the threshold value Snon-intrasearch in respect of the quality of the serving cell and determines whether the quality of the serving cell exceeds the threshold value Snon-intraserch (S450). If the quality of the serving cell exceeds the threshold value Snon-intraserch, the user equipment may omit intra-frequency measurement. If the quality of the serving cell does not exceed the threshold value Snon-intraserch, the user equipment performs intra-frequency measurement included in the cell reselection information for cell reselection (S460).

The user equipment performs cell reselection evaluation by using all the available measurement results (S470). Afterwards, if the cell reselection criterion is satisfied, the user equipment performs cell reselection (S480).

Through the above steps, the user equipment may omit measurement if the quality of the serving cell is good and at the same time perform cell reselection.

Next, Minimization of Drive Test (MDT) method will be described.

The MDT is to allow a service provider to measure quality of a cell by using a car, for optimization of cell coverage. Instead of a related art method for performing a drive test, the MDT may allow user equipments existing in the cell to perform measurement and report the measurement result. As a result, a cell coverage map may be generated, and the time and cost required for network optimization may be minimized.

The MDT may include two kinds of MDTs, i.e., Logged MDT and Immediate MDT.

The Logged MDT is a method that the user equipment performs MDT, logs MDT data and transfers the MDT data to the network at a specific time. The Immediate MDT is a method that the user equipment performs MDT and immediately transmits the MDT data to the network. The difference between these two methods is that the user equipment reports the test result to the eNB immediately or later. In particular, since the RRC_IDLE user equipment cannot report the test result due to no RRC connection, it uses the Logged MDT.

Generally, quality of a cell where the user equipment camps on is measured for the MDT, and is measured by reference signal received power (RSRP) and reference signal received quality (RSRP). If the Logged MDT is set to the user equipment, the user equipment measures quality of the cell at the RRC_IDLE mode and logs the measured quality, and then reports the MDT value to the network.

The service provider may draft a coverage map indicating available services over an overall area, where the service provider provides the services, and distribution of service quality level, from MDT values received from several user equipments, and may use the drafted coverage map for network management and optimization. For example, if a coverage problem of a specific area is received from the user equipment, the service provider may extend cell coverage of the corresponding area by increasing the transmission power of the base station that provides services of the corresponding area.

When the network intends to draft a coverage map of a service area through assistance of the user equipments that perform MDT for logging measured result and reporting the measured result to the network, there is difficulty in obtaining a coverage map of good quality for a specific frequency. The reasons why it is difficult for the network to obtain a coverage map of good quality for a specific frequency are as follows.

First of all, according to the related art, cells that may be measured and logged by the user equipment for Logged MDT have been limited to cells measured for cell reselection. As a result, cells that should be measured by the user equipment for cell reselection may be varied depending on quality of the serving cell. For example, if quality of the serving cell is very good, the target measured by the user equipment may be limited to the serving cell or neighboring cells at the same frequency as that of the serving cell, whereby the result measured, logged and reported by the user equipment may also be limited.

Also, the user equipment may continue to perform cell reselection to maintain the best serving cell if possible, and as a result, the frequency of the serving cell of the user equipment may be varied. The user equipment may not perform measurement for cells having frequency lower than frequency priority of the serving cell. Accordingly, since the frequencies measured by the user equipment are not provided uniformly, the frequencies logged and reported by the user equipment may not be uniform.

In order to solve the above problem, a cell measurement method for allowing a network to obtain a coverage map of good quality for a specific frequency and at the same time for not affecting an operation related to cell reselection of a user equipment will be suggested in the present invention.

In more detail, the present invention is characterized in that the user equipment performs more extended measurement without limiting a target cell for measurement to a measurement target for cell reselection. Also, the present invention is characterized in that a cell measured by extended measurement is excluded from targets for cell reselection even though the user equipment has performed extended measurement.

Figure 5:
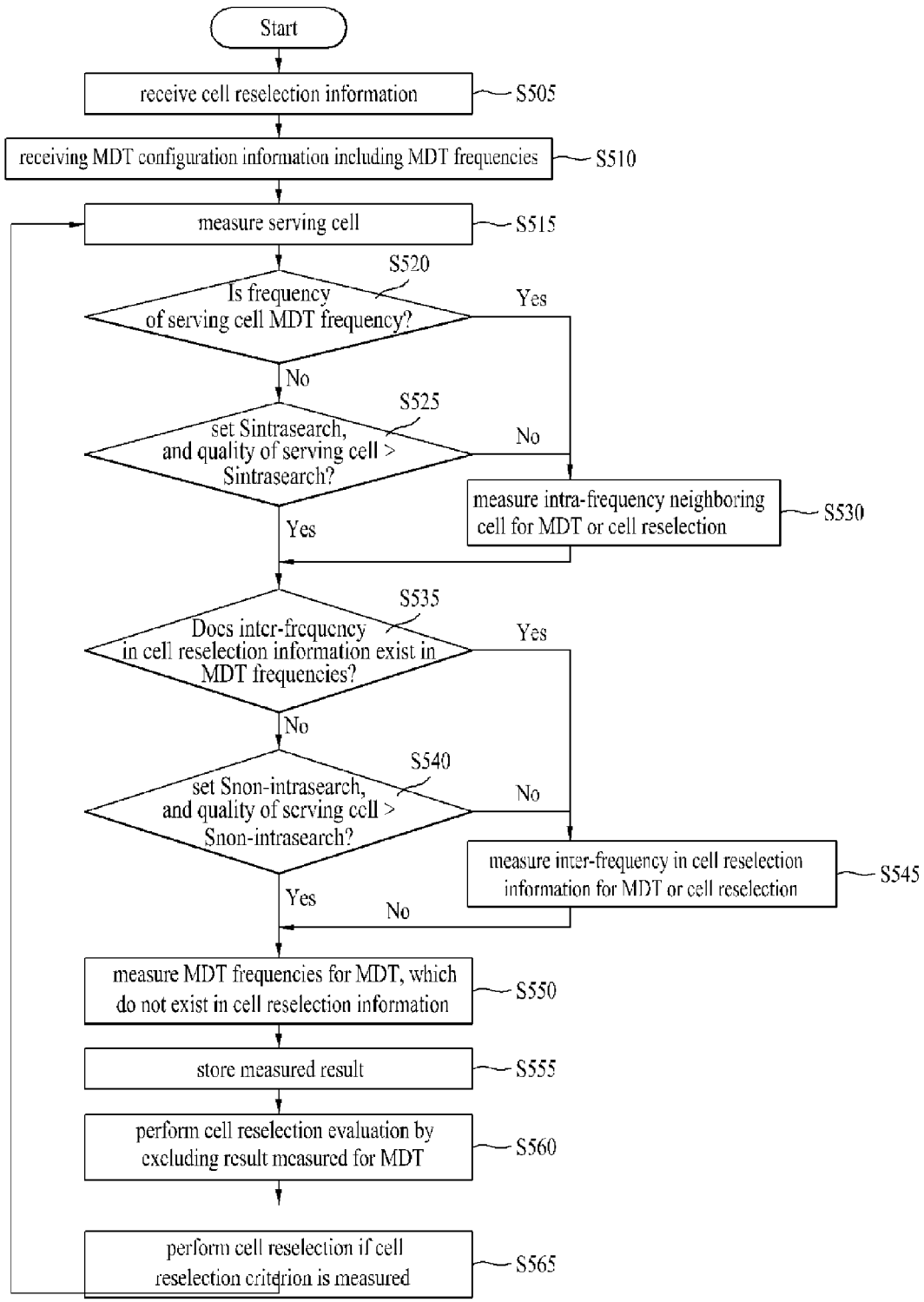
FIG. 5 is a flow chart illustrating a measurement method for MDT.

FIG. 5 is a flow chart illustrating a measurement and cell reselection method of a user equipment that has received frequency for MDT according to the present invention.

A flow chart of a measurement method for MDT will be described with reference to FIG. 5.

First of all, the user equipment receives cell reselection information (S505), and receives MDT configuration information that includes MDT frequency (S510).

The user equipment first measures quality of the serving cell (S515).

The user equipment determines whether the serving frequency is MDT frequency (S520). If the serving frequency is the MDT frequency, the user equipment performs intra-frequency measurement for MDT (S530).

In the meantime, if the serving frequency is not the MDT frequency, the user equipment determines whether the quality of the serving cell exceeds the threshold value Sintraserch (S525). If the quality of the serving cell does not exceed the threshold value Sintraserch, the user equipment performs intra-frequency measurement for cell reselection (S530).

Next, the user equipment determines whether inter-frequency related to the cell reselection information exists in the MDT frequencies (S535). If the inter-frequency related to the cell reselection information exists in the MDT frequencies, the user equipment performs inter-frequency measurement existing in cell reselection for MDT (S545).

If the inter-frequency related to the cell reselection information does not exist in the MDT frequencies, the user equipment sets the threshold value Snon-intrasearch and determines whether the quality of the serving cell exceeds the threshold value Snon-intraserch (S540). If the quality of the serving cell does not exceed the threshold value Snon-intraserch, the user equipment performs inter-frequency for cell reselection (S545).

If the MDT frequencies do not exist in the cell reselection information, the user equipment performs measurement for the MDT (S550). In other words, in the present invention, even though the measurement frequency for the MDT is the frequency that does not correspond to the measurement frequency for cell reselection, the user equipment may measure neighboring cells for the MDT.

The user equipment stores the measured result (S555). The user equipment may store both the result measured for the MDT and the result measured for cell reselection.

The user equipment excludes the result measured for the MDT in performing cell reselection evaluation (S560). The user equipment evaluates cell reselection through the result of the measurement for cell reselection. In this case, if the result measured for the MDT exists, the user equipment excludes the measured result from the cell reselection evaluation.

The user equipment performs cell reselection if the cell reselection criterion is satisfied (S565).

Through the above steps, the user equipment may perform the MDT if the frequency for the MDT is received. In this case, the result measured for the MDT may be excluded so as not to affect the result of cell reselection.

In other words, if the user equipment receives frequency information for the MDT, the user equipment performs measurement for the frequency for the MDT regardless of setting of the threshold value of the serving cell, which may omit measurement of the neighboring cell, and quality value of the serving cell.

If the user equipment receives frequency information for the MDT, the user equipment performs measurement for the frequency for the MDT even though quality of the serving cell is higher than the threshold value Sintrasearch that may omit intra-frequency measurement of the neighboring cell.

If the user equipment receives the frequency information for the MDT, the user equipment performs measurement for the frequency for the MDT even though quality of the serving cell is higher than the threshold value Snonintrafrequency that may omit inter-frequency measurement of the neighboring cell.

If the user equipment receives frequency information for the MDT, the user equipment performs measurement for the received MDT frequency regardless of the fact that cell reselection priority of the MDT frequency is set to the user equipment.

When the user equipment has received the frequency information for the MDT, and when cell reselection priority of the MDT frequency has set to the user equipment, the user equipment performs measurement for the frequency for the MDT without suspension even though cell reselection priority of the frequency for the MDT is lower than the frequency of the serving cell of the user equipment.

When the user equipment has received the frequency information for the MDT, the user equipment performs measurement for the frequency for the MDT even when cell reselection priority of the MDT frequency has not been set to the user equipment.

If the user equipment receives the frequency information for the MDT, it measures and stores the neighboring cell of the MDT frequency. However, in a state that measurement of the neighboring cell is not required as quality of the serving cell is sufficiently good, if the user equipment measures the neighboring cell for the MDT, the neighboring cell is excluded from the evaluation target for cell reselection. Accordingly, in this case, cell reselection is not performed by the corresponding neighboring cell. As a result, configuration of the MDT frequency does not affect cell reselection of the user equipment.

The MDT frequency information may be included in a message configuring a parameter of the user equipment related to the MDT.

The MDT may mainly be applied to MDT performed by the user equipment at the RRC_IDLE mode and does not exclude application to the MDT performed at the RRC_CONNECTED mode.

According to TS 36.304 which is the 3GPP standard document, measurement rules related to cell reselection are as follows.

When the user equipment evaluates quality values Srxlev and Squal of measurement target cells for the purpose of reselection, it uses parameters provided by the serving cell.

The following rules exist to limit measurement related to cell reselection.

(1) If the quality values Srxlev and Squal of the serving cell exceed threshold values SintraSearchP and SintraSearchQ, respectively, the user equipment does not perform intra-frequency measurement. If not so, the user equipment performs intra-frequency measurement.

(2) For E-UTRAN inter-frequency or inter-RAT frequency having reselection priority higher than that of reselection frequency of the current E-UTRAN frequency, the user equipment performs measurement E-UTRAN inter-frequency or inter-RAT frequency of higher priority regardless of the quality values of the serving cell.

(3) For inter-RAT frequency having reselection priority lower than that of reselection frequency of the current E-UTRAN frequency, and for E-UTRAN inter-frequency having reselection priority the same as or lower than that of the current E-UTRAN frequency, the user equipment performs operation as follows. In other words, if the quality values Srxlev and Squal of the serving cell exceed the threshold values SintraSearchP and SintraSearchQ, respectively, the user equipment does not perform measurement for E-UTRAN intra-frequencies or inter-RAT frequency cells having the same priority or lower priority.

In the present invention, the control method for the MDT measurement method may be added to the above rules for cell reselection.

In (1), even though the quality value of the serving cell exceeds the specific threshold value, if the user equipment receives the frequency for MDT, it additionally performs intra-frequency measurement for the MDT.

Also, in (3), even though the quality value of the serving cell exceeds the specific threshold value, if the user equipment receives the frequency for MDT, it additionally performs intra-frequency measurement for the MDT.

In the meantime, the result of the measurement additionally performed for the MDT is excluded from the cell reselection evaluation, whereby it may not be considered for the result of the measurement for cell reselection.

Hereinafter, the user equipment and the base station for performing the aforementioned measurement control method for the MDT will be described in another aspect of the present invention.

Figure 6:
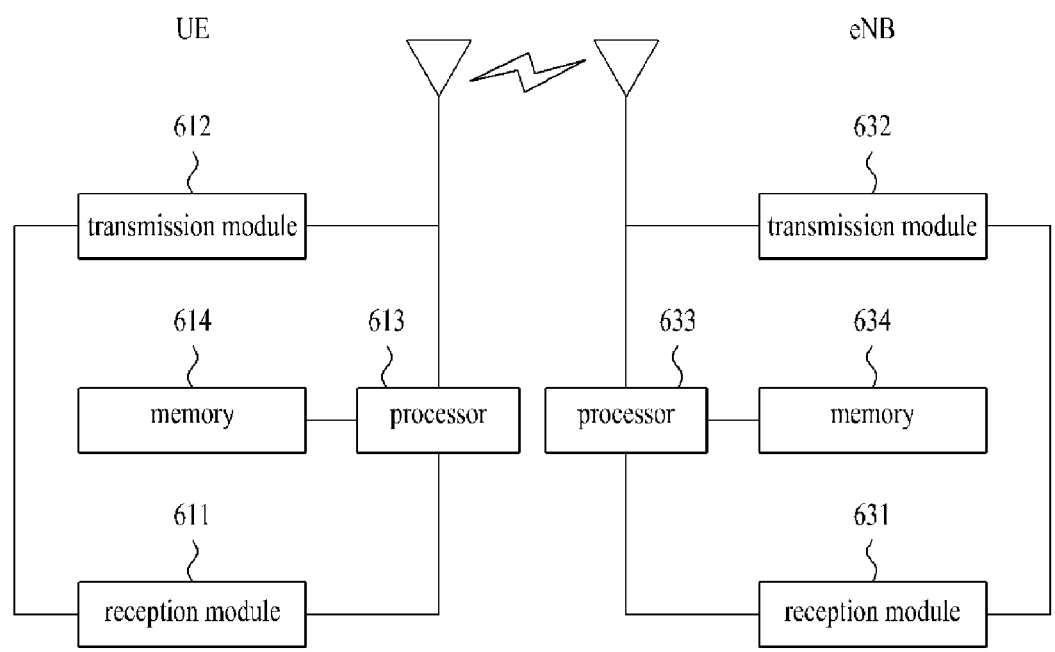
FIG. 6 is a block diagram illustrating a configuration of a wireless communication system that includes a user equipment and a base station according to the embodiment of the present invention.

FIG. 6 is a block diagram illustrating a configuration of a wireless communication system that includes a user equipment and a base station according to the embodiment of the present invention.

The user equipment UE may include a reception module 611, a transmission module 612, a processor 613, and a memory 614. The reception module 611 may receive various signals, data and information from the base station. The transmission module 612 may transmit various signals, data and information to the base station. Also, reception module 611 may receive measurement frequency for MDT or cell reselection information from the network. The measurement frequency for the MDT may be included in an MDT configuration message. The transmission module 612 may transmit an MDT measurement report message, which includes the result of MDT measurement, in accordance with measurement evaluation. The processor 613 may perform a control operation for MDT measurement and cell reselection. In more detail, the processor 613 may perform quality measurement of the serving cell, measurement of the neighboring cell, and an operation as to whether cell reselection is determined. Also, the processor 613 may measure quality of the neighboring cell for the MDT.

In the meantime, the base station eNB may include a reception module 631, a transmission module 632, a processor 633, and a memory 634. The reception module 631 may receive various signals, data and information from the user equipment. The transmission module 632 may transmit various signals, data and information to the user equipment.

In addition, the processor 633 may perform an operation processing function of information received by the user equipment and information to be transmitted externally. The memory 634 may store the operation processed information for a predetermined time period, and may be replaced with an element such as a buffer (not shown).

The embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

Although the aforementioned embodiments of the present invention have been described based on the 3GPP LTE based mobile communication system, they may be applied to various mobile communication systems that may simultaneously be used by the user equipment, and measurement operation for mobility management of the user equipment may be used.

The invention claimed is:

1. A measurement control method for minimization of drive test (MDT) in a user equipment, the method comprising the steps of:
   receiving measurement frequency information for cell reselection and measurement frequencies for MDT (MDT frequencies);
   measuring a quality of a serving cell;
   performing a first quality measurement for a neighboring cell;
   performing a second quality measurement for the neighboring cell; and
   storing results of the first and second quality measurements,
   wherein the step of performing the first quality measurement includes performing intra-frequency measurement for the MDT for the neighboring cell when the frequency of the serving cell is included in the MDT frequencies, and performing the intra-frequency measurement for the neighboring cell only in the case where the quality of the serving cell is less than a first threshold value when the frequency of the serving cell is not included in the MDT frequencies, and the step of performing the second quality measurement includes performing intra-frequency measurement for the MDT for the neighboring cell when an inter-frequency in the measured frequency information for the cell reselection corresponds to the MDT frequencies, and performing inter-frequency measurement for the neighboring cell only in the case where the quality of the serving cell is less than a second threshold value when the inter-frequency in the measured frequency information for the cell reselection does not correspond to the MDT frequencies.

2. The method according to claim 1, wherein the result of quality measurement for the MDT in the result of measurement for the neighboring cell is excluded from cell reselection evaluation.

3. The method according to claim 1, wherein the first threshold value is a value Sintrasearch and the second threshold value is a value Snonintrasearch.

4. The method according to claim 1, further comprising the step of performing measurement for the MDT for the neighboring cell for a specific frequency which is not included in the measurement frequency for the cell reselection, among the MDT frequencies.

5. The method according to claim 1, further comprising the step of performing the cell reselection considering the result of quality measurement for the neighboring cell.

6. The method according to claim 1, further comprising the step of transmitting the result measured for the MDT for the neighboring cell to a network.

7. A user equipment in a wireless communication system, the user equipment comprising:
   a reception module receiving measurement frequency information for cell reselection and measurement frequencies for minimization of drive test (MDT frequencies);
   a processor measuring a quality of a serving cell and performing a first quality measurement for a neighboring cell and a second quality measurement for the neighboring cell; and
   a memory storing results of the first and second quality measurements,
   wherein, in respect of the first quality measurement, the processor performs intra-frequency measurement for the MDT for the neighboring cell when the frequency of the serving cell is included in the MDT frequencies, and performs the intra-frequency measurement for the neighboring cell only in the case where the quality of the serving cell is less than a first threshold value when the frequency of the serving cell is not included in the MDT frequencies, and in respect of the second quality measurement, the processor performs inter-frequency measurement for the MDT for the neighboring cell when an inter-frequency in the measured frequency information for the cell reselection corresponds to the MDT frequencies, and performs the inter-frequency measurement for the neighboring cell only in the case where the quality of the serving cell is less than a second threshold value when the inter-frequency in the measured frequency information for the cell reselection does not correspond to the MDT frequencies.

8. The user equipment according to claim 7, wherein the processor excludes the result of quality measurement for the MDT in the result of measurement for the neighboring cell from cell reselection evaluation.

9. The user equipment according to claim 7, wherein the first threshold value is a value Sintrasearch and the second threshold value is a value Snonintrasearch.

10. The user equipment according to claim 7, wherein the processor performs measurement for the MDT for the neighboring cell for a specific frequency which is not included in the measurement frequency for the cell reselection, among the MDT frequencies.

11. The user equipment according to claim 7, further comprising a transmission module transmitting the result measured for the MDT for the neighboring cell to a network.

* * * * *